(12) United States Patent
Shih et al.

(10) Patent No.: US 9,025,117 B2
(45) Date of Patent: May 5, 2015

(54) LIQUID CRYSTAL DISPLAY PANEL AND MANUFACTURING METHOD THEREOF

(75) Inventors: Ming-Hung Shih, Guandong (CN); Zhenghua Li, Guandong (CN); Je-Hao Hsu, Guandong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 320 days.

(21) Appl. No.: 13/642,530

(22) PCT Filed: Sep. 7, 2012

(86) PCT No.: PCT/CN2012/081121
§ 371 (c)(1),
(2), (4) Date: Oct. 21, 2012

(87) PCT Pub. No.: WO2014/036721
PCT Pub. Date: Mar. 13, 2014

(65) Prior Publication Data
US 2014/0063426 A1  Mar. 6, 2014

(30) Foreign Application Priority Data
Sep. 4, 2012 (CN) .......................... 2012 1 0323550

(51) Int. Cl.
*G02F 1/1333* (2006.01)
*G02F 1/1362* (2006.01)

(52) U.S. Cl.
CPC .... *G02F 1/136286* (2013.01); *G02F 1/136204* (2013.01); *G02F 2001/133388* (2013.01)

(58) Field of Classification Search
CPC .................. G02F 1/136204; G02F 1/136286; G02F 2001/13629
USPC .......................................... 349/149, 151, 152
See application file for complete search history.

(56) References Cited

U.S. PATENT DOCUMENTS

| 7,122,830 B2 * | 10/2006 | Ishikawa et al. ................. 257/59 |
| 2004/0075782 A1 * | 4/2004 | Ha et al. ........................... 349/43 |
| 2005/0285988 A1 * | 12/2005 | Nakagawa ....................... 349/44 |

* cited by examiner

*Primary Examiner* — Thanh-Nhan P Nguyen
(74) *Attorney, Agent, or Firm* — Andrew C. Cheng

(57) ABSTRACT

The present invention provides a liquid crystal display panel, which comprises: a first conductive layer, a first insulating layer, a second conductive layer, a second insulating layer, and a third conductive layer; the first insulating layer being disposed on the first conductive layer and comprising at least two first via-holes corresponding respectively to at least two first subsidiary conductive regions so that at least two first subsidiary conductive regions being partially exposed through first via-holes; the second conductive layer being disposed on the first insulating layer; the second insulating layer being disposed on the second conductive layer; the second insulating layer being disposed on the second conductive layer and comprising at least two second via-holes corresponding respectively to at least two second subsidiary; a third conductive layer being connected with first subsidiary conductive regions and a second conductive layer.

11 Claims, 4 Drawing Sheets

LIQUID CRYSTAL DISPLAY PANEL AND MANUFACTURING METHOD THEREOF

BACKGROUND OF THE INVENTION

1. Field of the Invention

The present invention relates to the field of liquid crystal displaying techniques, and in particular to a liquid crystal display device and manufacturing method thereof.

2. The Related Arts

Liquid crystal display technology is a mainstream display panel technology. The active area of a liquid crystal display panel is surrounded by a larger area of perimeter metal wiring layer. The large area of perimeter metal wiring layer accumulates static electricity during the manufacturing process, and the accumulation of static electricity causes the damage of vulnerable parts of active area of a display panel. The result is the waste of materials and the increase of additional production cost. Therefore, a crystal display panel and a manufacturing method thereof are provided to solve the problems.

SUMMARY OF THE INVENTION

The technical issue to be addressed by the present invention is to provide a liquid crystal display panel and a manufacturing method to prevent risks of accumulation of static electricity on the large area of perimeter metal wiring layer during the manufacturing process in the known technique.

The present invention provides a liquid crystal display panel, which comprises: a first conductive layer, a first insulating layer, a second conductive layer, a second insulating layer, and a third conductive layer; the first conductive layer comprising at least two first subsidiary conductive regions disposed disconnected, and the first conductive layer being a metal conductive layer; the first insulating layer being disposed on the first conductive layer and comprising at least two first via-holes corresponding respectively to at least two first subsidiary conductive regions so that at least two first subsidiary conductive regions being partially exposed through first via-holes; the second conductive layer being disposed on the first insulating layer; the second conductive layer comprising at least two second subsidiary conductive regions disposed disconnected, and the second conductive layer being a metal conductive layer; the second insulating layer being disposed on the second conductive layer and comprising at least two second via-holes corresponding respectively to at least two second subsidiary conductive regions so that at least two second subsidiary conductive regions being partially exposed through second via-holes; the third conductive layer being an indium-tin-oxide transparent conducting layer, and being connected with at least two first subsidiary conductive regions and at least two second subsidiary conductive regions through first via-holes and second via-holes.

According to a preferred embodiment of the present invention, the at least two first subsidiary conductive regions are stripe-structured, which disposed parallely on the first conductive layer.

According to a preferred embodiment of the present invention, the at least two second subsidiary conductive regions are stripe-structured, which disposed parallely on the second conductive layer.

According to a preferred embodiment of the present invention, the first conductive layer, the second conductive layer, and the third conductive layer are disposed as the surrounding area of active area of the liquid crystal display panel.

The present invention provides a liquid crystal display panel, which comprises: a first conductive layer, a first insulating layer, a second conductive layer, a second insulating layer, and a third conductive layer; the first conductive layer comprising at least two first subsidiary conductive regions disposed disconnected, and the first conductive layer; the first insulating layer being disposed on the first conductive layer and comprising at least two first via-holes corresponding respectively to at least two first subsidiary conductive regions so that at least two first subsidiary conductive regions being partially exposed through first via-holes; the second conductive layer being disposed on the first insulating layer; the second insulating layer being disposed on the second conductive layer and comprising at least two second via-holes corresponding respectively to at least two second subsidiary conductive regions so that at least two second subsidiary conductive regions being partially exposed through second via-holes; the third conductive layer being connected with at least two first subsidiary conductive regions and the second conductive layer through first via-holes and second via-holes.

According to a preferred embodiment of the present invention, the at least two first subsidiary conductive regions are stripe-structured, which disposed parallely on the first conductive layer.

According to a preferred embodiment of the present invention, the second conductive layer comprises at least two second subsidiary conductive regions disposed disconnected, and the second conductive layer; the second insulating layer are disposed on the second conductive layer and comprise at least two second via-holes corresponding respectively to at least two second subsidiary conductive regions so that at least two second subsidiary conductive regions are partially exposed through second via-holes.

According to a preferred embodiment of the present invention, the at least two second subsidiary conductive regions are stripe-structured, which disposed parallely on the second conductive layer.

According to a preferred embodiment of the present invention, the first conductive layer is a metal conductive layer, the second conductive layer is a metal conductive layer, and the third conductive layer is an indium-tin-oxide transparent conducting layer.

According to a preferred embodiment of the present invention, the first conductive layer, the second conductive layer, and the third conductive layer are disposed as the surrounding area of active area of the liquid crystal display panel.

The present invention provides a manufacturing method of liquid crystal display panel, which comprises: forming a first conductive layer; cutting at least two first subsidiary conductive regions disposed disconnected on the first conductive layer, forming a first insulating layer being disposed on the first conductive layer and comprising at least two first via-holes corresponding respectively to at least two first subsidiary conductive regions so that at least two first subsidiary conductive regions being partially exposed through first via-holes; forming a second conductive layer being disposed on the first insulating layer; forming the second insulating layer being disposed on the second conductive layer and comprising at least two second via-holes corresponding respectively to at least two second subsidiary conductive regions so that at least two second subsidiary conductive regions being partially exposed through second via-holes; forming a third conductive layer being connected with at least two first subsidiary conductive regions and the second conductive layer through first via-holes and second via-holes.

According to a preferred embodiment of the present invention, the step of forming a second conductive layer on a first insulating layer further comprises: cutting at least two second subsidiary conductive regions disposed disconnected on the second conductive layer; the step of forming a second insulating layer on the second conductive layer comprises: forming at least two second via-holes corresponding respectively to at least two second subsidiary conductive regions so that at least two second subsidiary conductive regions being partially exposed through second via-holes; the step of forming a third conductive layer on the first insulating layer and the second insulating layer comprises: forming the third conductive layer being connected with at least two first subsidiary conductive regions and the second conductive layer through first via-holes and second via-holes.

According to a preferred embodiment of the present invention, the first conductive layer is a metal conductive layer, the second conductive layer is a metal conductive layer, and the third conductive layer is an indium-tin-oxide transparent conducting layer.

According to a preferred embodiment of the present invention, the first conductive layer, the second conductive layer, and the third conductive layer are disposed as the surrounding area of active area of the liquid crystal display panel.

The efficacy of the present invention is that to be distinguished from the state of the art. The present invention, through cutting a large first conductive layer into a plurality of first subsidiary conductive regions, can prevent risks of accumulation of static electricity on the large area of perimeter metal wiring layer during the manufacturing process in the known technique.

DETAILED DESCRIPTION OF THE PREFERRED EMBODIMENTS

Figure 1:
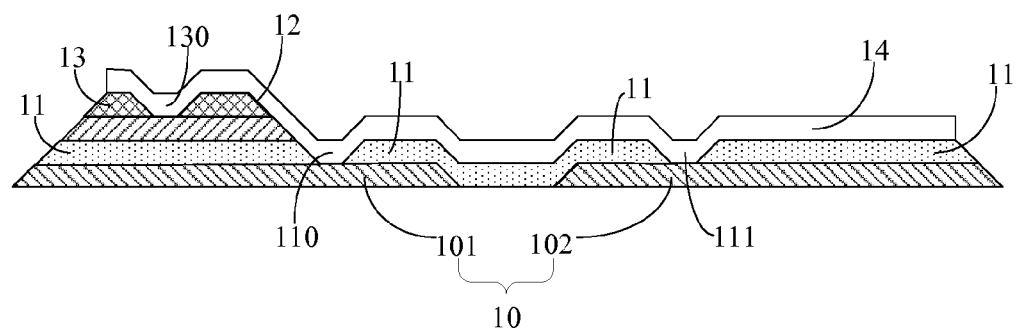
FIG. 1 is a schematic view showing the structure of the first embodiment of a liquid crystal display panel of the present invention.

Referring FIG. 1; FIG. 1 is a schematic view showing the structure of the first embodiment of a liquid crystal display panel of the present invention. In the instant embodiment, liquid crystal display panel 1 comprises: first conductive layer 10, first insulating layer 11, second conductive layer 12, second insulating layer 13, and third conductive layer 14.

In the instant embodiment, a first conductive layer 10 comprises: two first subsidiary conductive regions 101, 102, the two first subsidiary conductive regions 101 102 are disconnected. In a preferred embodiment, the two first subsidiary conductive regions 101 102 are stripe-structured disposed parallely. In other embodiments, first subsidiary conductive regions can be more than two, which are stripe-structured disposed parallely.

A first insulating layer 11 is disposed on a first conductive layer 10; first insulating layer 11 comprises two first via-holes 110, 111; first via-hole 110 on first insulating layer 11 being disposed on first subsidiary conductive region 101 first via-hole 111 on a first insulating layer 11 being disposed on a first subsidiary conductive region 102; first via-hole 110 exposing first subsidiary conductive region 101 partially; first via-hole 111 exposing first subsidiary conductive region 102 partially. In other embodiments, the amount of first via-holes on the first insulating layer and first subsidiary conductive regions are identical. First via-holes on the first insulating layer correspond respectively to first subsidiary conductive regions expose subsidiary conductive regions partially.

Second conductive layer 12 is disposed on first subsidiary conductive region 101 and on first insulating layer 11. Second conductive layer 12 does not cover a first via-hole 110.

Second insulating layer 13 is disposed on second conductive layer 12. Second via-hole 130, which is on second insulating layer 13, exposes second conductive layer 12 partially.

Third conductive layer 14 is disposed on first insulating layer 11 and second insulating layer 13; third conductive layer 14 covering first via-hole 110, first via-hole 111, and second via-hole 130; third conductive layer 14 being connected with two first subsidiary conductive regions 101 102 and second conductive layer 12 through a first via-hole 110, a first via-holes 111, and second via-hole 130; third conductive layer 14 establishing electric connection within two first subsidiary conductive regions 101 102 and second conductive layer 12.

In the preferred instant embodiment, first conductive layer 10 is a metal conductive layer, second conductive layer 12 is a metal conductive layer, and the third conductive layer 14 is an indium-tin-oxide transparent conducting layer.

In summary, through designing of cutting a large first conductive layer into disconnected portions of first subsidiary conductive regions, the present invention can prevent risks of accumulation of static electricity on the large area of perimeter metal wiring layer during the manufacturing process in the known technique.

Figure 2:
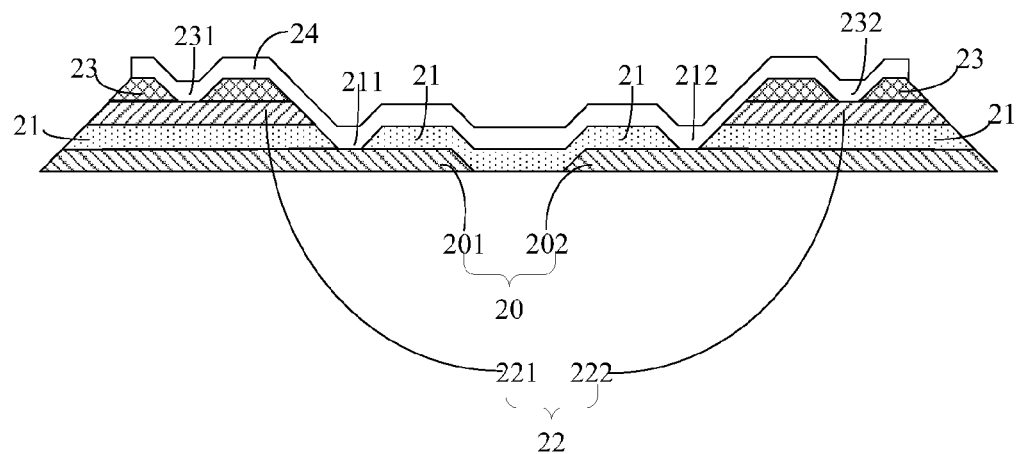
FIG. 2 is a schematic view showing the structure of the second embodiment of a liquid crystal display panel of the present invention.

Referring FIG. 2, FIG. 2 is a schematic view showing the structure of the first embodiment of a liquid crystal display panel of the present invention. In the instant embodiment, a liquid crystal display panel 2 comprises: a first conductive layer 20, a first insulating layer 21, a second conductive layer 22, a second insulating layer 23, and a third conductive layer 24.

In the instant embodiment, a first conductive layer 20 comprises: two first subsidiary conductive regions 201 202. The two first subsidiary conductive regions 201 202 are disconnect portions. The two first subsidiary conductive regions 201 202 are stripe-structured disposed parallely, which is preferred. In other embodiments, first subsidiary conductive regions can be more than two, which are stripe-structured disposed parallely.

A first insulating layer 21 is disposed on a first conductive layer 20. A first insulating layer 21 comprises two first via-holes 211, 212. A first via-hole 211, which is on a first insulating layer 21, disposed on a first subsidiary conductive region 201. A first via-hole 212, which is on a first insulating layer 21, disposed on a first subsidiary conductive region 202. A first via-hole 211 exposes a first subsidiary conductive region 201 partially. A first via-hole 212 exposes a first subsidiary conductive region 202 partially. In other embodiments, the amount of first via-holes on a first insulating layer and first subsidiary conductive regions are identical. First via-holes on a first insulating layer correspond respectively to first subsidiary conductive regions expose subsidiary conductive regions partially.

A second conductive layer 22 is disposed on a first insulating layer 21. In the instant embodiment, a second conductive layer 22 comprises: two second subsidiary conductive regions 221, 222. The two second subsidiary conductive regions 221 222 are disconnect portions. The two second subsidiary conductive regions 221 222 are stripe-structured disposed parallely, which is preferred. In other embodiments, second subsidiary conductive regions can be more than two, which are stripe-structured disposed parallely.

A second insulating layer 23 is disposed on a second conductive layer 22. A second via-hole 231, which is on a second insulating layer 23, disposed on a second subsidiary conductive region 221. A second via-hole 231 exposes a second subsidiary conductive region 221 partially. A second via-hole 232, which is on a second insulating layer 23, disposed on a second subsidiary conductive region 222. A second via-hole 232 exposes a second subsidiary conductive region 222 partially. In other embodiments, the amount of second via-holes on a second insulating layer and second subsidiary conductive regions are identical. Second via-holes on a second insulating layer correspond respectively to second subsidiary conductive regions expose subsidiary conductive regions partially.

A third conductive layer 24 is disposed on a first insulating layer 21 and a second insulating layer 23. A third conductive layer 24 covers a first via-hole 211, a first via-holes 212, second via-hole 231, and second via-hole 232. A third conductive layer 24 passes through a first via-hole 211, a first via-holes 212, second via-hole 231, and second via-hole 232 to connect two first subsidiary conductive regions 201 202 and two subsidiary conductive regions 221 222. A third conductive layer 24 establishes electric connection within two first subsidiary conductive regions 201, 202 and two subsidiary conductive regions 221, 222.

In the instant embodiment, a first conductive layer 20 is a metal conductive layer, which is preferred. A second conductive layer 22 is a metal conductive layer, which is preferred. In the preferred embodiment, third conductive layer 24 is an indium-tin-oxide transparent conducting layer, which is preferred.

In summary, through designing of cutting a large second conductive layer into disconnected portions of second subsidiary conductive regions, the present invention can prevent risks of accumulation of static electricity on the large area of perimeter metal wiring layer during the manufacturing process in the known technique.

Figure 3:
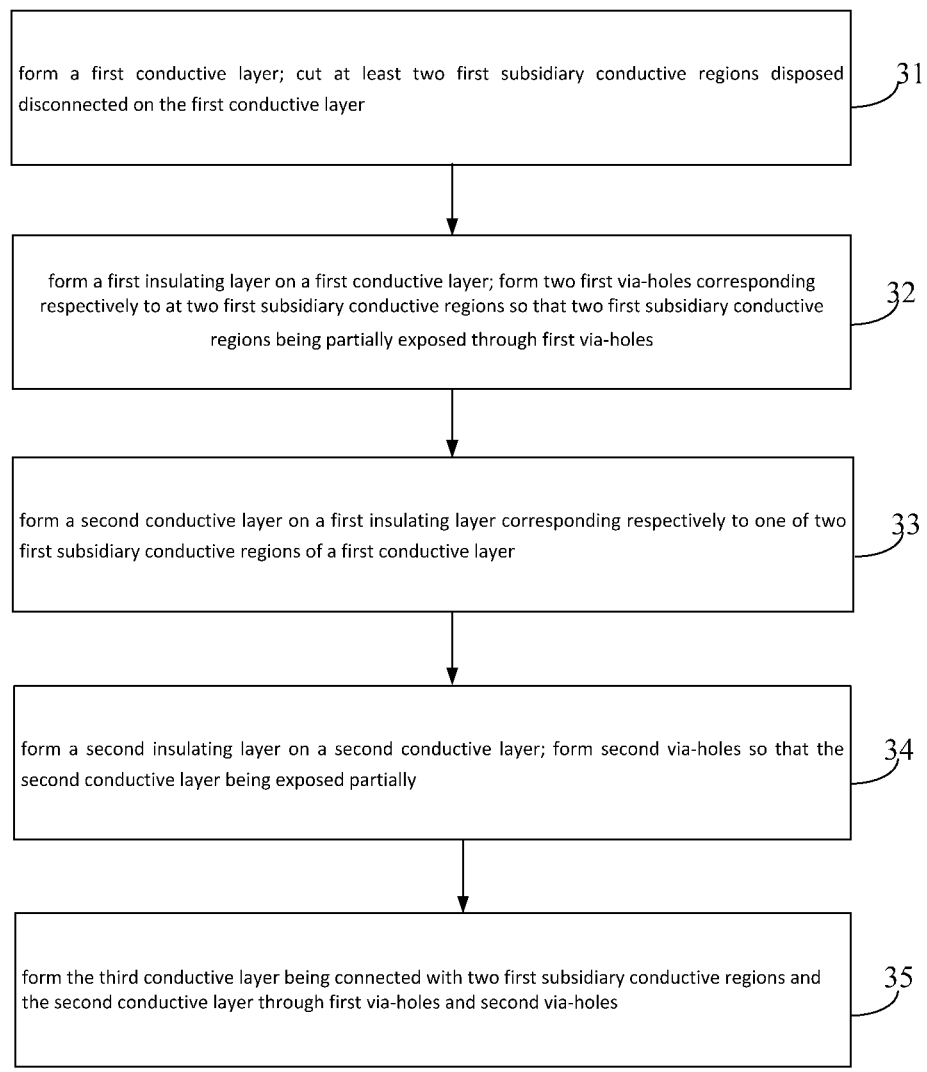
FIG. 3 is a flowchart of manufacturing method of the third embodiment of a liquid crystal display panel of the present invention.

Referring FIG. 3, FIG. 3 is a flowchart of manufacturing method of the third embodiment of a liquid crystal display panel of the present invention. In the instant embodiment, manufacturing method of a liquid crystal display panel comprises:

Step 31: form a first conductive layer; cut at least two first subsidiary conductive regions disposed disconnected on the first conductive layer. In the preferred embodiment, at least two first subsidiary conductive regions are stripe-structured disposed parallely, and a first conductive layer is a metal conductive layer.

Step 32: form a first insulating layer on a first conductive layer; form at least two first via-holes corresponding respectively to at least two first subsidiary conductive regions so that at least two first subsidiary conductive regions being partially exposed through first via-holes.

Step 33: form a second conductive layer on a first insulating layer corresponding respectively to one of at least two first subsidiary conductive regions of a first conductive layer. In the preferred embodiment, the second conductive layer is a metal conductive layer and does not cover first via-holes.

Step 34: form a second insulating layer on a second conductive layer; form at least two second via-holes so that second conductive layer being partially exposed through second via-holes form second via-holes.

Step 35: form a third conductive layer on a first insulating layer and a second insulating layer being connected with two first subsidiary conductive regions and a second conductive layer through first via-holes and second via-holes. In the preferred embodiment, third conductive layer is an indium-tin-oxide transparent conducting layer.

Figure 4:
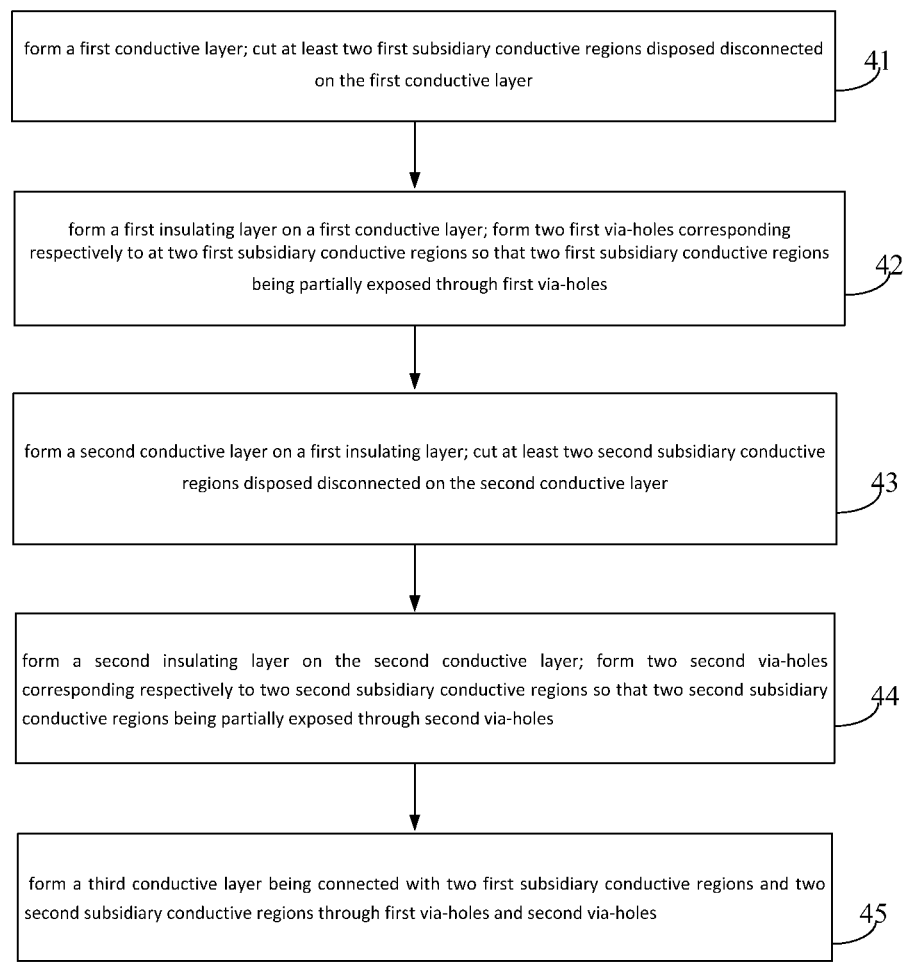
FIG. 4 is a flowchart of manufacturing method of the fourth embodiment of a liquid crystal display panel of the present invention.

Referring FIG. 4, FIG. 4 is a flowchart of manufacturing method of the third embodiment of a liquid crystal display panel of the present invention. In the instant embodiment, manufacturing method of a liquid crystal display panel comprises:

Step 41: form a first conductive layer; cut at least two first subsidiary conductive regions disposed disconnected on the first conductive layer. In the preferred embodiment, at least two first subsidiary conductive regions are stripe-structured disposed parallely, and the first conductive layer is a metal conductive layer.

Step 42: form a first insulating layer on a first conductive layer; form at least two first via-holes corresponding respectively to at least two first subsidiary conductive regions so that at least two first subsidiary conductive regions being partially exposed through first via-holes.

Step 43: form a second conductive layer on a first insulating layer; cut at least two second subsidiary conductive regions disposed disconnected on the second conductive layer. At least two second subsidiary conductive regions do not cover corresponding at least two first via-holes. Two second subsidiary conductive regions are stripe-structured disposed parallely. In the preferred embodiment, the amount of second subsidiary conductive regions is less than or equals to the amount of first subsidiary conductive.

Step 44: form a second insulating layer on a second conductive layer; form at least two second via-holes corresponding respectively to at least two second subsidiary conductive regions so that at least two second subsidiary conductive regions being partially exposed through second via-holes.

Step 45: form a third conductive layer on a first insulating layer and a second insulating layer being connected two first subsidiary conductive regions and two second subsidiary conductive regions through first via-holes and second via-holes. In the preferred embodiment, the third conductive layer is an indium-tin-oxide transparent conducting layer.

Figure 5:
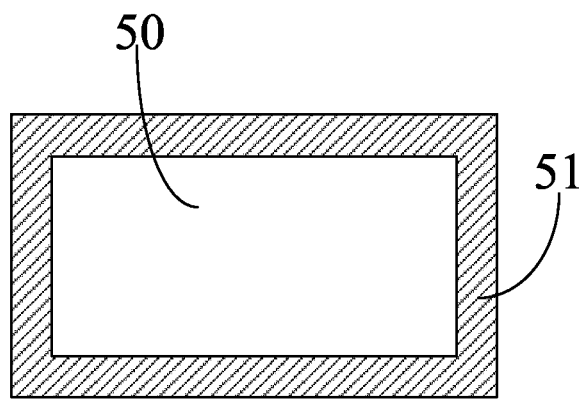
FIG. 5 a schematic view showing the structure of the fifth embodiment of an active area of a liquid crystal display panel of the present invention.

Referring FIG. 5, FIG. 5 a schematic view showing the structure of the fifth embodiment of an active area of a liquid crystal display panel of the present invention. In all embodiments, a first conductive layer, a second conductive layer, and a third conductive layer are disposed as the surrounding area 51 of active area 50 of the liquid crystal display panel 5.

In summary, through designing of cutting a large first conductive layer into disconnected portions of first subsidiary conductive regions, the present invention can prevent risks of accumulation of static electricity, which causes the damage of vulnerable parts of active area of a display panel, on the large area of perimeter metal wiring layer during the manufacturing process in the known technique. Via-holes and a third conductive layer ensure the normal function of electrical conductivity of a large metal layer.

The present invention, through cutting a large first conductive layer into disconnected portions of first subsidiary conductive regions, can prevent risks of accumulation of static electricity on the large area of perimeter metal wiring layer during the manufacturing process in the known technique.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A liquid crystal display panel, which comprises:
   a first conductive layer, the first conductive layer comprising at least two first subsidiary conductive regions disposed disconnected, and the first conductive layer being a metal conductive layer;
   a first insulating layer, the first insulating layer being disposed on the first conductive layer and comprising at least two first via-holes corresponding respectively to at least two first subsidiary conductive regions so that at least two first subsidiary conductive regions being partially exposed through first via-holes;
   a second conductive layer, the second conductive layer being disposed on the first insulating layer; the second conductive layer comprising at least two second subsidiary conductive regions disposed disconnected, and the second conductive layer being a metal conductive layer;
   a second insulating layer, the second insulating layer being disposed on the second conductive layer and comprising at least two second via-holes corresponding respectively to at least two second subsidiary conductive regions so that at least two second subsidiary conductive regions being partially exposed through second via-holes;
   a third conductive layer, the third conductive layer being an indium-tin-oxide transparent conducting layer, and being connected with at least two first subsidiary conductive regions and at least two second subsidiary conductive regions through first via-holes and second via-holes; and
   wherein, the first conductive layer, the second conductive layer, and the third conductive layer are disposed as the surrounding area of active area of the liquid crystal display panel.

2. The liquid crystal display panel as claimed in claim 1, characterized in that the at least two first subsidiary conductive regions are stripe-structured and disposed parallely.

3. The liquid crystal display panel as claimed in claim 1, characterized in that the at least two second subsidiary conductive regions are stripe-structured and disposed parallely.

4. A liquid crystal display panel, which comprises:
   a first conductive layer with disconnect portions comprise at least two first subsidiary conductive regions disposed on the first conductive layer;
   a first insulating layer is disposed on the first conductive layer where the first insulating layer comprises at least two first via-holes corresponding respectively to at least two first subsidiary conductive regions of the first conductive layer with at least two first subsidiary conductive regions embedded in first via-holes and exposed partially;
   a second conductive layer is disposed on the first insulating;
   a second insulating layer is disposed on the second conductive layer with second via-holes exposed partially;
   a third conductive layer is disposed on the first insulating layer and the second insulating layer connected with at least two first subsidiary conductive regions and the second conductive layer through first via-holes and second via-holes; and
   wherein the first conductive layer, the second conductive layer, and the third conductive layer are disposed as the surrounding area of active area of the liquid crystal display panel.

5. The liquid crystal display panel as claimed in claim 4, characterized in that the at least two first subsidiary conductive regions are stripe-structured and disposed parallely.

6. The liquid crystal display panel as claimed in claim 4, characterized in that the disconnected portions, which are at least two second subsidiary conductive regions, are disposed on a second conductive layer; the second insulating layer comprises at least two second via-holes, which correspond respectively to at least two second subsidiary conductive regions of a second conductive layer; at least two second subsidiary conductive regions are embedded in second via-holes and exposed partially; the third conductive layer is connected with at least two first subsidiary conductive regions and at least two second subsidiary conductive regions through first via-holes and second via-holes.

7. The liquid crystal display panel as claimed in claim 6, characterized in that the at least two second subsidiary conductive regions are stripe-structured and disposed parallely.

8. The liquid crystal display panel as claimed in claim 4, characterized in that the first conductive layer and the second conductive layer are metal conductive layers. and the third conductive layer is an indium-tin-oxide transparent conducting layer.

9. A manufacturing method of liquid crystal display panel, which comprises:
   forming a first conductive layer, at least two first subsidiary conductive regions disposed disconnected on the first conductive layer;
   forming a first insulating layer on the first conductive layer and forming at least two first via-holes corresponding respectively to at least two first subsidiary conductive regions so that at least two first subsidiary conductive regions being partially exposed through first via-holes;
   forming a second conductive layer on the first insulating layer;
   forming a second insulating layer on the second conductive layer and forming second via-holes so that the second conductive layer being partially exposed; and
   forming the third conductive layer on the first insulating layer and the second insulating layer being connected with at first subsidiary conductive regions and the second conductive layer through first via-holes and second via-holes; and
   wherein the first conductive layer, the second conductive layer, and the third conductive layer are disposed as the surrounding area of active area of the liquid crystal display panel.

10. The liquid crystal display panel as claimed in claim 9, characterized in that the step of forming a second conductive layer on a first insulating layer further comprises:
    at least two second subsidiary conductive regions disposed disconnected on the second conductive layer;
    the step of forming a second insulating layer on a second conductive layer further comprises: forming at least two second via-holes corresponding respectively to at least two second subsidiary conductive regions so that at least two second subsidiary conductive regions being partially exposed through second via-holes; and
    the step of forming a third conductive layer on a first insulating layer and a second insulating layer further comprises: the third conductive layer being connected with at least two first subsidiary conductive regions and the second subsidiary conductive regions through first via-holes and second via-holes.

11. The liquid crystal display panel as claimed in claim 9, characterized in that the first conductive layer and the second conductive layer are metal conductive layers, and the third conductive layer is an indium-tin-oxide transparent conducting layer.

* * * * *